United States Patent
Kamegawa

(10) Patent No.: US 8,116,589 B2
(45) Date of Patent: Feb. 14, 2012

(54) IMAGE PROCESSING APPARATUS

(75) Inventor: Hideki Kamegawa, Tokyo (JP)

(73) Assignee: Oki Semiconductor Co., Ltd.

( * ) Notice: Subject to any disclaimer, the term of this patent is extended or adjusted under 35 U.S.C. 154(b) by 908 days.

(21) Appl. No.: 12/142,813

(22) Filed: Jun. 20, 2008

(65) Prior Publication Data

US 2009/0046946 A1    Feb. 19, 2009

(30) Foreign Application Priority Data

Aug. 17, 2007 (JP) ................................ 2007-212745

(51) Int. Cl.
G06K 9/36 (2006.01)
(52) U.S. Cl. ........................................ 382/284
(58) Field of Classification Search .................. 382/284
See application file for complete search history.

(56) References Cited

U.S. PATENT DOCUMENTS 5,850,058 A  * 12/1998 Tano et al. ............... 178/18.01
2002/0176005 A1 * 11/2002 Okamoto et al. ........ 348/207.99
2004/0051529 A1 *  3/2004 Zhu et al. ..................... 324/318
2004/0228508 A1 * 11/2004 Shigeta ........................ 382/124
2005/0226479 A1 * 10/2005 Takahashi .................... 382/124

FOREIGN PATENT DOCUMENTS

JP    2003331269    11/2003
JP    2005004718    1/2005

* cited by examiner

Primary Examiner — Bhavesh M Mehta
Assistant Examiner — Nirav G Patel
(74) Attorney, Agent, or Firm — Volentine & Whitt, PLLC

(57) ABSTRACT

An image processing apparatus includes a partial image memory unit for reading partial image data from an image pickup device and sequentially storing the partial image data, and an image composition unit for generating the composite image data by synthesizing the partial image data from the partial image memory unit. Only when a composition incomplete signal does not exist, the partial image memory unit stores the partial image data and generates a storage completion signal upon completing storage of the partial image data. The image composition unit generates the composition incomplete signal when the composite image data is generated, on condition that the storage completion signal is present. The image composition unit reads at least one of the partial image data from the partial image memory unit and starts the generation of the composite image data using the partial image data when the composite image data is not generated.

6 Claims, 12 Drawing Sheets

IMAGE PROCESSING APPARATUS

BACKGROUND OF THE INVENTION

1. Field of the Invention

The present invention relates to an image processing apparatus for picking up (video-taping, shooting, photographing, filming) a plurality of images while moving an image pickup area to obtain plural pieces of image data (referred to as "partial image data) and then for synthesizing the partial image data to generate composite image data.

2. Description of the Related Art

A fingerprint authentication system, a bar-code reader or the like produces image data by obtaining an image of a fingerprint, a bar code or the like. The image data of a fingerprint, a bar code or the like is produced as composite image data made by synthesizing a plurality of partial image data obtained as a result of picking up a plurality of images while slowly or gradually moving an image pickup (photographing) area of an image pickup apparatus. The image processing apparatus for generating the composite image data synthesizes the partial image data every time the partial image data is taken (picked up) by the image pickup apparatus. In order to synthesize the partial image data every time the partial image data is obtained, the composition (synthesizing) of the partial image data just picked up should be finished prior to the completion of an image pickup process for the next partial image data that will be subsequently synthesized. Upon picking up the next partial image data for the subsequent composition, a composition process is carried out using that partial image data. When the last partial image data is obtained and the composition of this last partial image data is completed, a generation of the composite image data is completed (See Japanese Patent Application Laid-Open (Kokai) Publication No. 2003-331269).

SUMMARY OF THE INVENTION

The above-described apparatus carries out the partial image data synthesizing process every time the partial image data is picked up by the image pickup apparatus. In order to synthesize the partial image data every time the partial image data is obtained, the composition of the partial image data must be finished prior to the completion of taking a next partial image that will be subsequently synthesized. Consequently, a timing signal must be generated for finishing the composition of the partial image data prior to the completion of taking the next partial image.

Time required for picking up (photographing, video-taping) an image on a pickup (photographing, video-taping) area by an image pickup apparatus such as a fingerprint sensor is different, depending on a kind of an image pickup apparatus and other factors. Consequently, if there are a plurality of image pickup apparatuses, it is necessary to generate a timing signal based on an image pick up time required for an image pickup apparatus in question. If the timing signal is generated by hardware, required circuits increase. If the timing signal is generated by software, required software codes increase, that is, an amount of memories increases.

The image processing apparatus must finish the composition of the partial image data prior to the completion of picking up an image for the next partial image data that will be synthesized next. Consequently, it is essential to use (choose) an image pickup apparatus whose image picking up time is longer than a time required for synthesizing the partial image data.

An object of the present invention is to provide an image processing apparatus that does not require hardware (circuits or the like) or software for generating a timing signal and that can use many kinds of image pickup apparatuses.

According to one aspect of the present invention, there is provided an image processing apparatus for using image data, which is obtained by taking (picking up) an image while moving an image pickup area by degrees, as partial image data and for generating composite image data by synthesizing the partial image data. The image processing apparatus includes a partial image memory module for reading the partial image data from the image pickup apparatus, and sequentially storing the partial image data. The image processing apparatus also includes an image composition unit for generating the composite image data by synthesizing the partial image data obtained from the partial image memory module. The partial image memory module stores the partial image data only when a composition incomplete signal does not exist. The partial image memory module generates a storage completion signal when the storage of the partial image data is completed. The image composition unit generates the composition incomplete signal when the composite image data is being generated, under the existence of the storage completion signal. The image composition unit reads at least one of the partial image data from the partial image memory module and starts the generation of the composite image data using the partial image data when the composite image data is not being generated, under the existence of the storage completion signal.

If a composition incomplete signal is present (i.e., if the composite image data is being generated), the most recently obtained partial image data is not stored. Since the storage of the partial image data is skipped when the composite image data is being generated, it is not necessary to generate a timing signal for completing the generation of the composite image data prior to the completion of picking up an image for the partial image data that will be subsequently synthesized.

Since the composite image data is generated every time one partial image data is obtained, it is not necessary to delay the start of the generation of the composite image data until all of the partial image data is obtained. Consequently, time required for the generation of the composite image data can be shortened. Since it is not necessary to store all of the partial image data, the memory capacity can be reduced.

These and other objects, aspects and advantages of the present invention will become more apparent to those skilled in the art when the following detailed description is read and understood in conjunction with the appended claims and drawings.

DETAILED DESCRIPTION OF THE PRESENT INVENTION

Embodiments of the present invention will be described below in detail with reference to the drawings.

Figure 1:
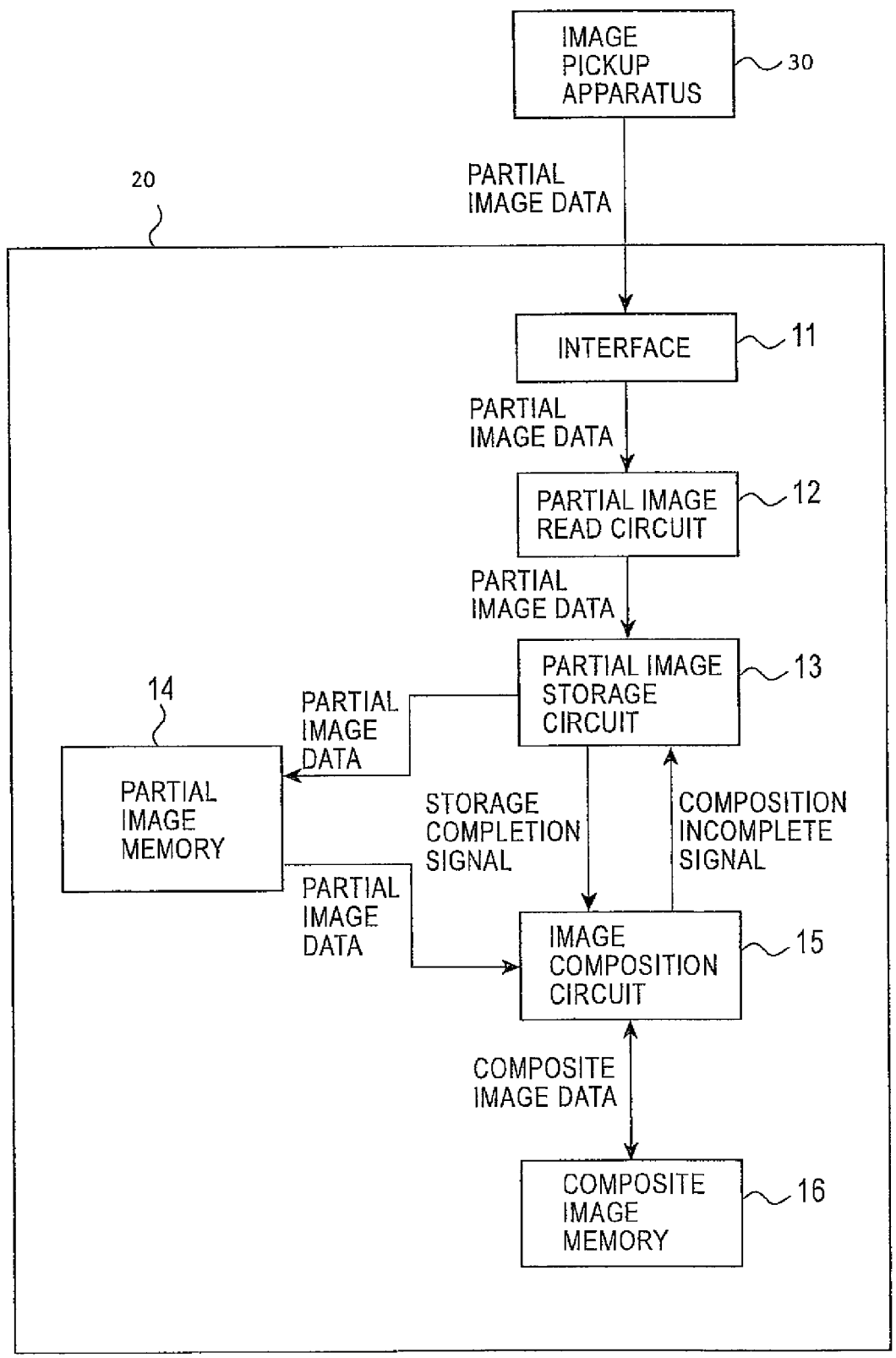
FIG. 1 illustrates a block diagram of an image processing apparatus in accordance with a first embodiment of the present invention.

Referring to FIG. 1, a first embodiment of an image processing apparatus 20 will be described. An image pickup apparatus 30 picks up images of a target. An image processing apparatus 20 reads image data from the image pickup apparatus 30 as partial image data, and generates composite image data by synthesizing the partial image data. An interface 11 is provided for transmitting and receiving data between the image processing apparatus 20 and the image pickup apparatus 30. A partial image reading circuit 12 reads the partial image data, which is data of an image picked up by the image pickup apparatus 30, via the interface 11. A partial image storage circuit 13 stores the partial image data, that is read by the partial image read circuit 12, into a partial image memory 14. The partial image storage circuit 13 generates a storage completion signal when the storage of the partial image data to the partial image memory 14 is completed. The partial image storage circuit 13 stores the partial image data to the partial image memory 14 only when a composition incomplete signal does not exist. The partial image data that is read when a composition incomplete signal exists is not stored to the partial image memory 14. The partial image memory 14 is designed to store the partial image data taken (picked up) by the image pickup apparatus 30. The partial image reading circuit 12, the partial image storage circuit 13, and the partial image memory 14 configure a partial image memory unit (module). An image composition circuit 15 is provided for synthesizing the partial image data stored in the partial image memory 14 to generate composite image data. The image composition circuit 15 reads one of the partial image data from the partial image memory 14 and reads composite image data from a composite image memory 16. The image composition circuit 15 then generates composite image data by using the partial image data and the composite image data. The generated composite image data is stored to the composite image memory 16. The image composition circuit 15 generates a composition incomplete signal if the existence of a storage completion signal is detected while the composite image data is being generated. The composite image memory 16 is provided for storing the composite image data synthesized by the image composition circuit 15. The image composition circuit 15 and the composite image memory 16 configure an image composition unit.

The image pickup apparatus 30 is provided for taking (picking up) an image while moving an image pickup area slowly and for transmitting the obtained image data to the image processing apparatus 20. The image pickup apparatus 30 may be a fingerprint sensor. The image pickup apparatus 30 can pick up a plurality of images sequentially.

Figure 2:
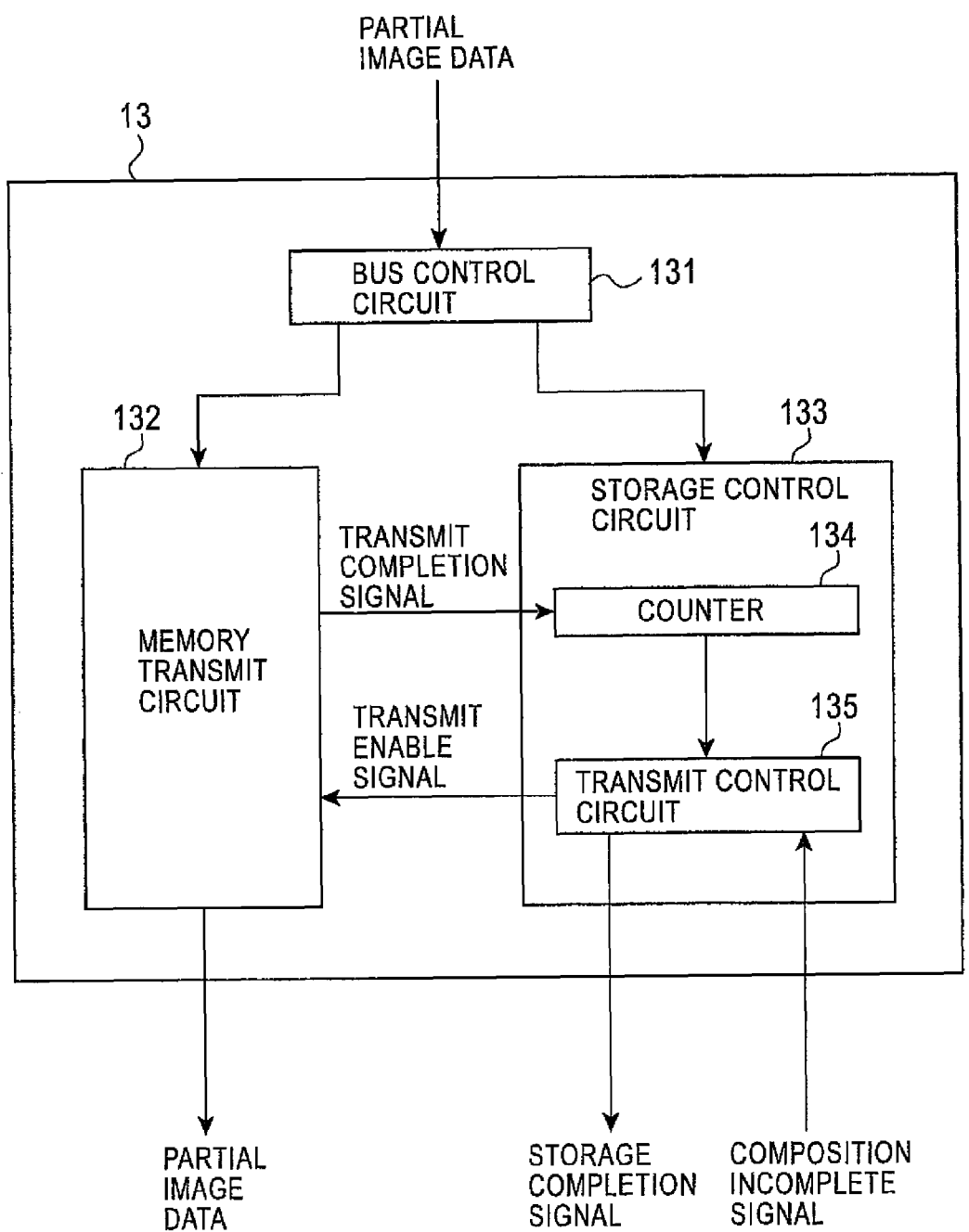
FIG. 2 illustrates a block diagram of a partial image storage circuit in the image processing apparatus shown in FIG. 1.

Referring to FIG. 2, the configuration of the partial image storage circuit 13 will be described. The partial image storage circuit 13 has a bus control circuit 131 for controlling the transmission and reception of data to/from the partial image read circuit 12. The partial image storage circuit 13 also has a memory transmit circuit 132 for transmitting the partial image data to the partial image memory 14. The partial image storage circuit 13 also has a storage control circuit 133 for controlling the storage of the partial image data to the partial image memory 14. The memory transmit circuit 132 transmits the partial image data, that is received from the bus control circuit 131, to the partial image memory 14 only when a transmit enable signal issued from the storage control circuit 133 exists. The memory transmit circuit 132 generates a transmit completion signal every time the transmission of a certain amount of image data (unit of image data) is completed. The storage control circuit 133 has a counter 134 for counting the number of generations of the transmit completion signal and a transmit control circuit 135 for controlling the memory transmit circuit 132. The counter 134 receives the transmit completion signal, that is generated by the memory transmit circuit 132, and counts the number of the received transmit completion signals. The counter 134 then informs the transmit control circuit 135 of the value of the count. The transmit control circuit 135 checks the existence of a composition incomplete signal, and generates the transmit enable signal if the composition incomplete signal does not exist. The transmit control circuit 135 confirms the value of the count of the counter 134, and generates the storage completion signal when an amount of image data that has been transmitted from the memory transmit circuit 132 reaches an amount of one partial image data.

Figure 3:
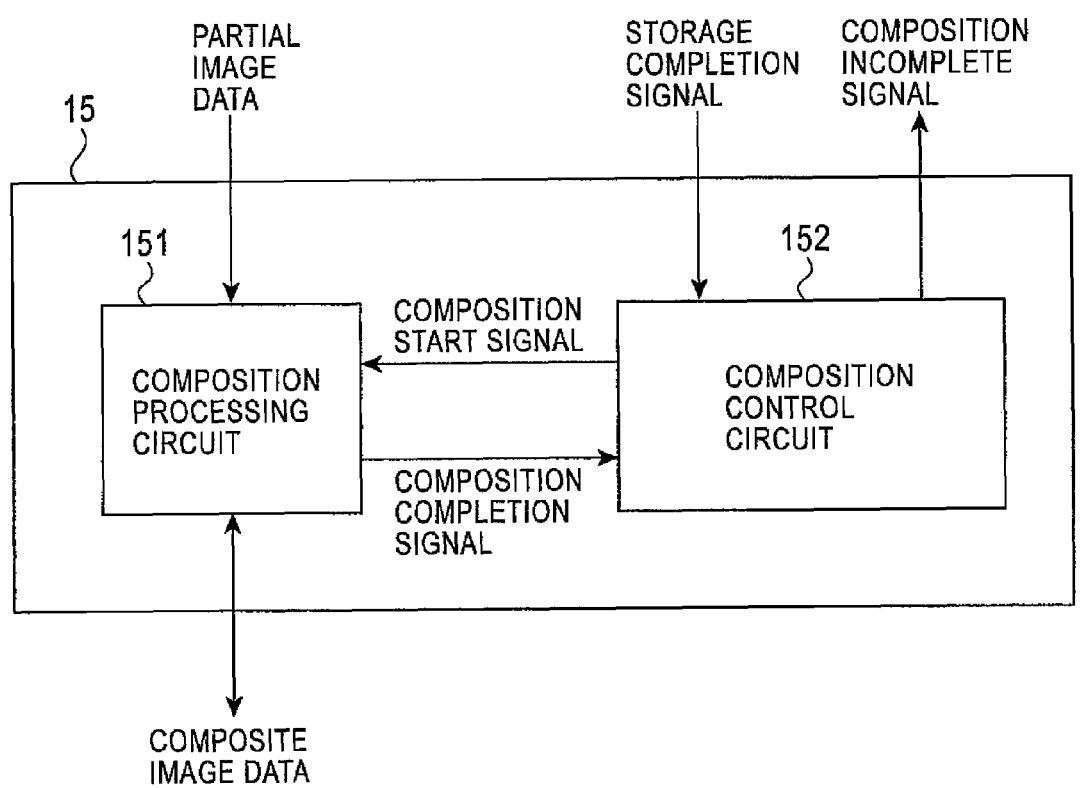
FIG. 3 illustrates a block diagram of an image composition circuit in the image processing apparatus shown in FIG. 1.

Referring to FIG. 3, the configuration of the image composition circuit 15 will be described. The image composition circuit 15 has a synthesizing circuit 151 for generating the composite image data and a composition control circuit 152 for controlling the composition processing circuit 151. The composition processing circuit 151 starts the generation of the composite image data when the existence of a composition start signal sent from the composition control circuit 152 is detected. The generation of the composite image data is carried out by synthesizing the partial image data, which is supplied from the partial image memory 14, to the composite image data, which is supplied from the composite image memory 16. The newly generated composite image data is then stored into the composite image memory 16. When the storage of the composite image data into the composite image memory 16 is completed, the composition processing circuit 151 generates a composition completion signal. When the composition control circuit 152 detects the existence of the storage completion signal, the composition control circuit 152 transmits a new composition start signal to the composition processing circuit 151 if the composition control circuit 152 confirms the reception of the composition completion signal corresponding to the previously generated composition start signal. On the other hand, the composition control circuit 152 generates a composition incomplete signal if the existence of the storage completion signal is detected but the composition control circuit 152 does not confirm the reception of the composition completion signal corresponding to the previously generated composition start signal.

Figure 4:
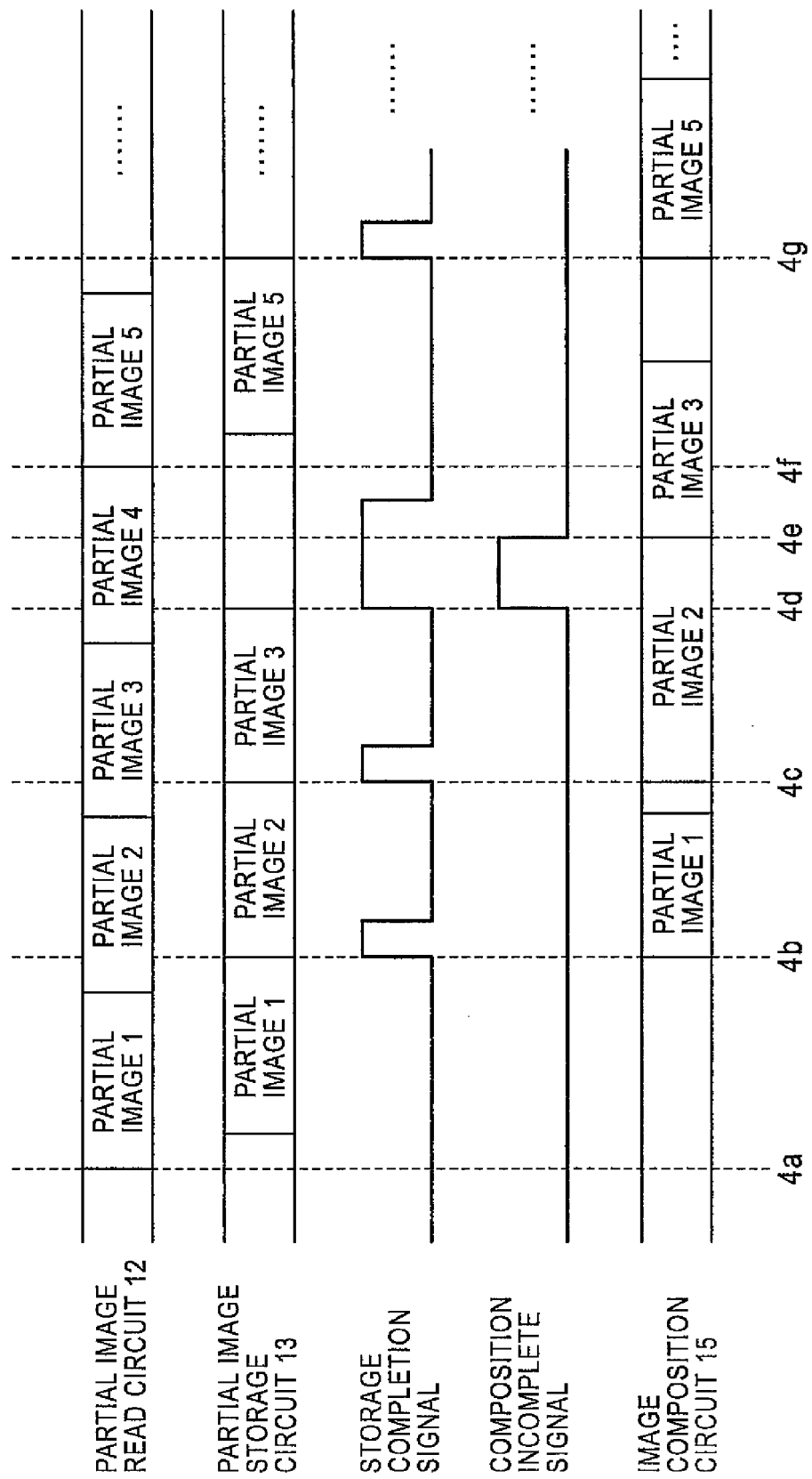
FIG. 4 is a timing chart showing an operation of the image processing apparatus shown in FIG. 1.

Referring now to FIG. 4, an operation of the image processing apparatus 20 will be described. FIG. 4 illustrates an operation when the five partial image data is read and the composite image data is generated.

When the partial image reading circuit 12 starts the reading of the partial image data 1 from the image pickup apparatus 30 at a point (time) 4a, the partial image storage circuit 13 checks a composition incomplete signal. If the composition incomplete signal does not exist, the partial image storage circuit 13 stores the partial image data 1 into the partial image memory 14. When the storage of the partial image data 1 to the partial image memory 14 is completed at a point 4b, the partial image storage circuit 13 makes the storage completion signal turn to High. Making the storage completion signal turn to High corresponds to the generation of the storage completion signal. When the image composition circuit 15 detects a fact that the storage completion signal turns to High at the point 4b, that is, when the existence of the storage completion signal is detected, the image composition circuit 15 reads the partial image data 1 from the partial image memory 14 and starts the generation of the composite image data. Since the partial image data 1 is the first partial image data, the partial image data 1 is only read and stored to the composite image memory 16 in the composite image data generating process.

When the storage of the partial image data 1 to the partial image memory 14 is completed at the point 4b, the partial image storage circuit 13 confirms the absence of the composition incomplete signal, and stores the next partial image data 2 to the partial image memory 14. When the storage of the partial image data 2 to the partial image memory 14 is completed at a point 4c, the partial image storage circuit 13 generates the storage completion signal. When the image composition circuit 15 detects the existence of the storage completion signal at the point 4c, the image composition circuit 15 reads the partial image data 2 from the partial image memory 14 and reads the composite image data from the composite image memory 16. The image composition circuit 15 then starts to generate the composite image data using the partial image data 2.

When the storage of the partial image data 2 to the partial image memory 14 is completed at the point 4c, the partial image storage circuit 13 confirms the absence of the composition incomplete signal, and stores the next partial image data 3 to the partial image memory 14. When the storage of the partial image data 3 to the partial image memory 14 is completed at a point 4d, the partial image storage circuit 13 generates the storage completion signal.

When the image composition circuit 15 detects the existence of the storage completion signal at the point 4d during the generation of the composite image data, the image composition circuit 15 makes the composition incomplete signal turn to High, that is, the composition incomplete signal is generated. The image composition circuit 15 then continues the generation of the composite image data. When the partial image storage circuit 13 detects that the composition incomplete signal turns to High at the point 4d, that is, when the existence of the composition incomplete signal is detected, the partial image storage circuit 13 skips the storage of the subsequently read partial image data 4 to the partial image memory 14.

After the image composition circuit 15 synthesizes the partial image data 2 to the composite image data and stores the resulting composite image data to the composite image memory 16, the image composition circuit 15 makes the composition incomplete signal turn to Low (at a point 4e). When the image composition circuit 15 detects the existence of a storage completion signal after the generation of the composite image data using the partial image data 2, the image composition circuit 15 reads the partial image data 3 from the partial image memory 14 and reads the composite image data from the composite image memory 16. The image composition circuit 15 then starts the generation of the composite image data using the partial image data 3.

When the partial image read circuit 12 starts to read the partial image data 5 at a point 4f, the partial image storage circuit 13 confirms that the composition incomplete signal is Low, that is, the composition incomplete signal does not exist, and the partial image storage circuit 13 stores the partial image data 5, which is read after the partial image data 4, to the partial image memory 14. When the storage of the partial image data 5 to the partial image memory 14 is completed at a point 4g, the partial image storage circuit 13 generates the storage completion signal. When the image composition circuit 15 detects the existence of the storage completion signal at the point 4g, the image composition circuit 15 reads the partial image data 5 stored after the partial image data 3 and the composite image data. The image composition circuit 15 then synthesizes the partial image data 5 to the composite image data and stores the resulting composite image data to the composite image memory 16.

The storage completion signal turns to Low after the start of the generation of the composite image data using the corresponding partial image data. The state in which the storage completion signal is Low corresponds the state in which the storage completion signal does not exist.

Figure 5:
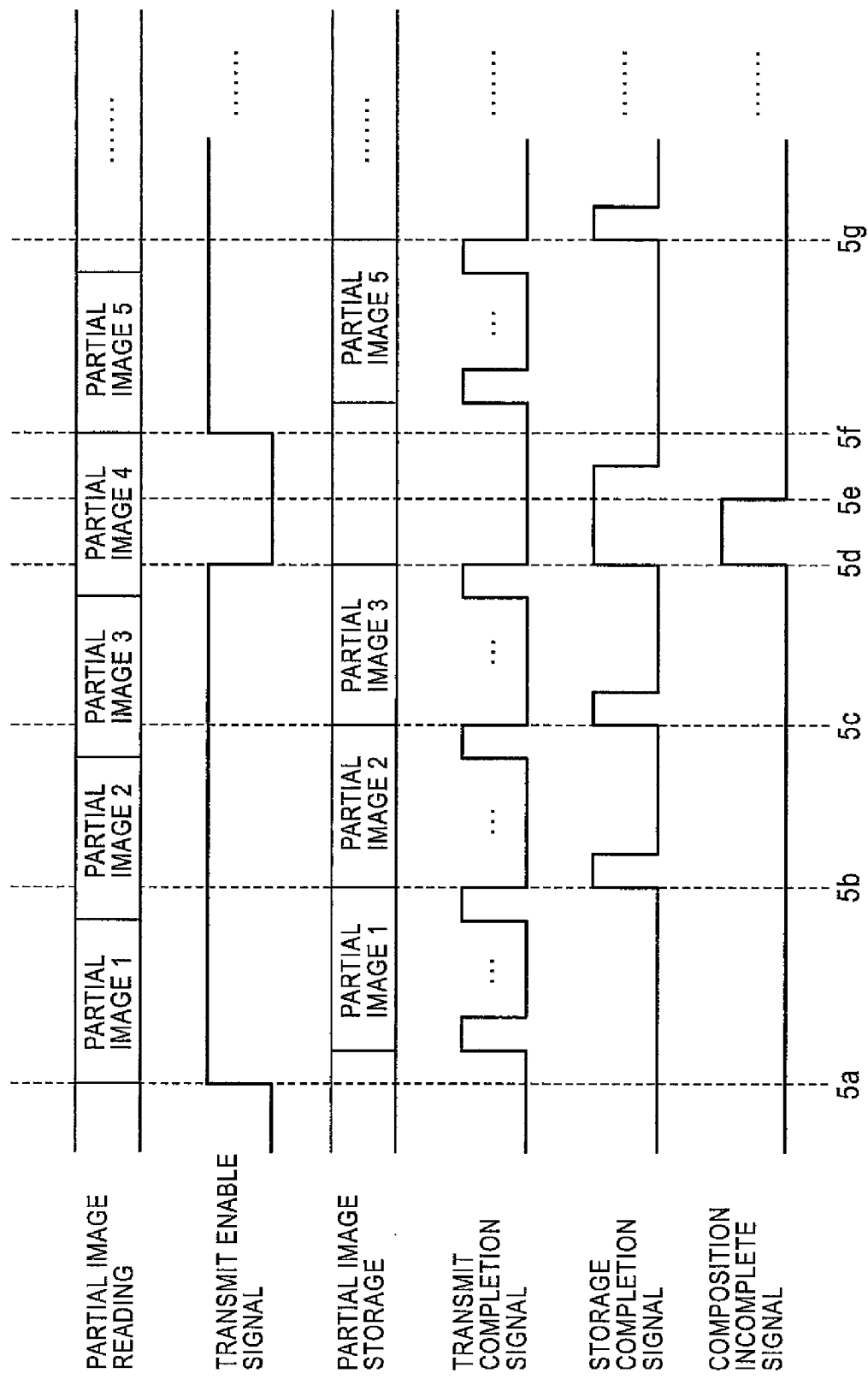
FIG. 5 is a timing chart showing an operation of the partial image storage circuit in the image processing apparatus of FIG. 1.

Referring to FIG. 5, an operation of the partial image storage circuit 13 will be described. FIG. 5 depicts an operation when the five partial image data is read and the composite image data is generated.

When the partial image read circuit 12 starts to read the partial image data 1 from the image pickup apparatus 30 at a point 5a, the transmit control circuit 135 checks a composition incomplete signal. If the composition incomplete signal does not exist, the transmit enable signal turns to High, that is, the transmit enable signal is generated. When the memory transmit circuit 132 confirms that the transmit enable signal is High, that is, the existence of the transmit enable signal is confirmed, the memory transmit circuit 132 transmits the partial image data 1 to the partial image memory 14. The memory transmit circuit 132 makes the transmit completion signal turn to high (i.e., the transmit completion signal is generated) every time the transmission of a particular amount of image data is completed.

The counter 134 receives the transmit completion signal, that is generated by the memory transmit circuit 132, and carries out the counting. The transmit control circuit 135 checks the value of the count of the counter 134. The transmit control circuit 135 makes the storage completion signal turn to high (i.e., the storage completion signal is generated at a point 5b) when an amount of image data that has been transmitted reaches an amount of the partial image data 1. When the transmission of the partial image data 1 is completed at the point 5b, the memory transmit circuit 132 confirms the existence of the transmit enable signal and transmits the subsequently read partial image data 2 to the partial image memory 14. The memory transmit circuit 132 generates the transmit completion signal every time the transmission of a predetermined unit of image data is completed.

The counter 134 receives the transmit completion signal, that is generated by the memory transmit circuit 132, and carries out the counting. The transmit control circuit 135 checks the value of the count of the counter 134, and generates the storage completion signal (at a point 5c) when an amount of image data that has been transmitted reaches an amount of the partial image data 2. When the transmission of the partial image data 2 is completed at the point 5c, the memory transmit circuit 132 confirms the existence of the transmit enable signal and transmits the subsequently read partial image data 3 to the partial image memory 14. The memory transmit circuit 132 generates the transmit completion signal every time the transmission of image data of a predetermined unit is completed.

The counter 134 receives the transmit completion signal from the memory transmit circuit 132 and carries out the counting. The transmit control circuit 135 checks the value of the count of the counter 134, and generates the storage completion signal (at a point 5*d*) when an amount of image data that has been transmitted reaches an amount of the partial image data 3. When the transmit control circuit 135 confirms the existence of the composition incomplete signal at a point 5*d*, the transmit control circuit 135 makes the transmit enable signal turn to Low. When the memory transmit circuit 132 confirms that the transmit enable signal is Low, that is, the transmit enable signal does not exist, the memory transmit circuit 132 stops the data transmission to the partial image memory 14. Consequently, the partial image data 4, which has been read after the partial image data 3, is not stored into the partial image memory 14. In other words, the storage of the partial image data 4 is skipped.

When the partial image reading circuit 12 starts to read the partial image data 5 from the image pickup apparatus 30 at a point 5*f*, the transmit control circuit 135 confirms the absence of the composition incomplete signal, and generates the transmit enable signal. When the memory transmit circuit 132 confirms the existence of the transmit enable signal, the memory transmit circuit 132 transmits the partial image data 5 to the partial image memory 14. The memory transmit circuit 132 generates the transmit completion signal every time the transmission of image data of a predetermined unit is completed.

The counter 134 receives the transmit completion signal from the memory transmit circuit 132 and carries out counting. The transmit control circuit 135 checks the value of the count of the counter 134, and generates the storage completion signal (at a point 5*g*) when an amount of image data that has been transmitted reaches an amount of the partial image data 5.

Figure 6:
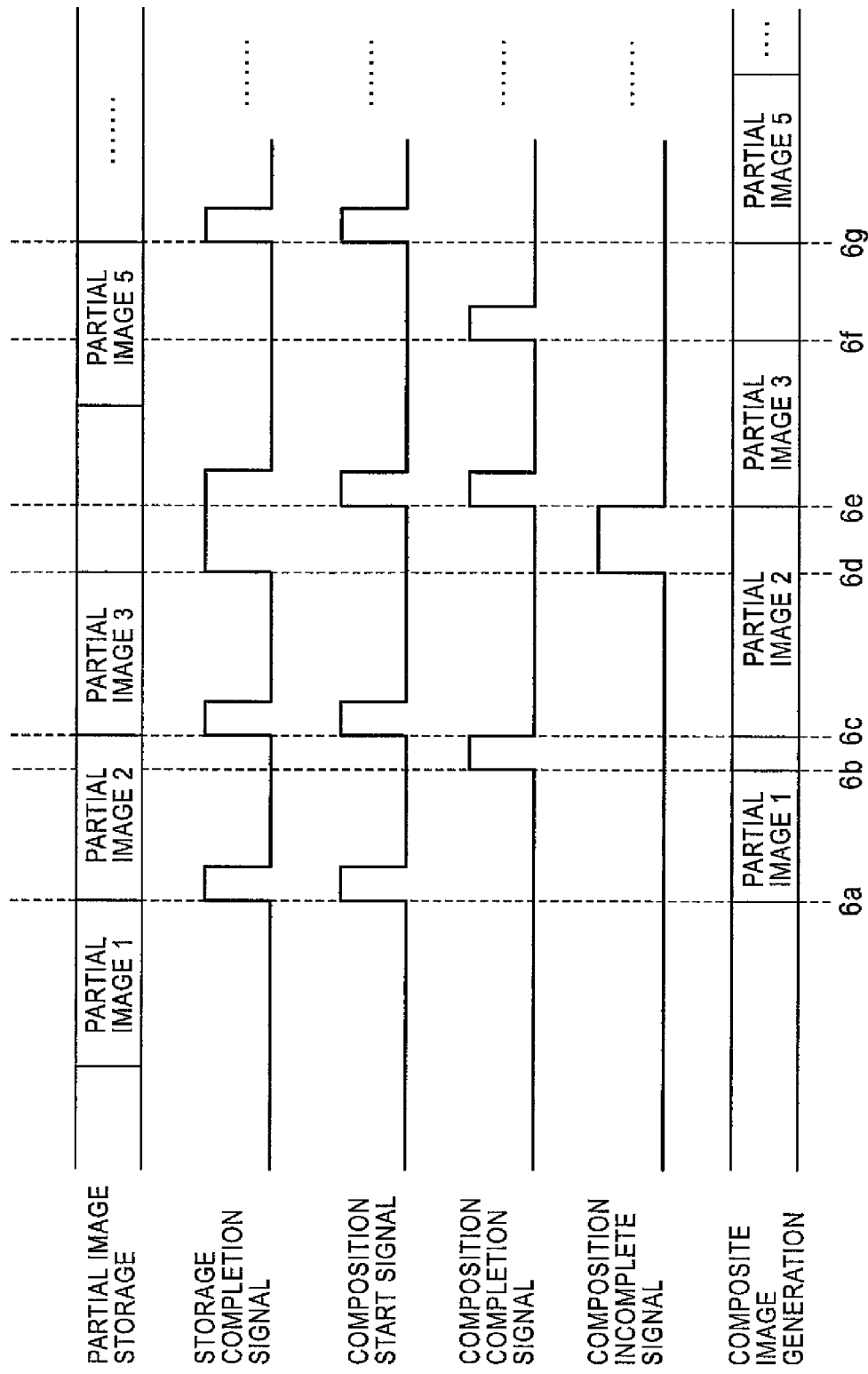
FIG. 6 is a timing chart showing an operation of the image composition circuit in the image processing apparatus of FIG. 1.

Referring to FIG. 6, an operation of the image composition circuit 15 will be described. FIG. 6 illustrates an operation when the five partial image data is read and the composite image data is generated from the four partial image data.

If the composition control circuit 152 confirms the existence of the storage completion signal of the partial image data 1 at a point 6*a*, the composition control circuit 152 confirms that the composition processing circuit 151 is not generating the composite image data. Then, the composition control circuit 152 makes the composition start signal turn to High, that is, the composition start signal is generated. When the composition processing circuit 151 confirms that the composition start signal is High, that is, the existence of the composition start signal is confirmed, the composition processing circuit 151 starts to generate the composite image data using the partial image data 1. When the composition processing circuit 151 completes the generation of the composite image data using the partial image data 1, the composition processing circuit 151 makes the composition completion signal turn to High, that is, the composition completion signal is generated (at a point 6*b*).

When the composition control circuit 152 confirms the existence of the storage completion signal of the partial image data 2 at a point 6*c*, the composition control circuit 152 confirms the reception of the composition completion signal corresponding to the previously generated composition start signal (i.e., it confirms that the composition processing circuit 151 is not generating the composite image data). Then, the composition control circuit 152 generates the composition start signal. Upon confirming the existence of the composition start signal, the composition processing circuit 151 starts to generate the composite image data using the partial image data 2.

If the composition control circuit 152 confirms the existence of the storage completion signal of the partial image data 3 at a point 6*d*, the composition control circuit 152 cannot confirm the reception of the composition completion signal corresponding to the previously generated composition start signal. Consequently, the composition control circuit 152 determines that the composition processing circuit 151 is generating the composite image data, and makes the composition incomplete signal turn to High.

When a generation of the composite image data using the partial image data 2 is completed at a point 6*e*, the composition processing circuit 151 generates the composition completion signal. When the composition control circuit 152 confirms the reception of the composition completion signal, the composition control circuit 152 makes the composition incomplete signal turn to Low, and generates the composition start signal. Upon confirming the existence of the composition start signal, the composition processing circuit 151 starts to generate the composite image data using the partial image data 3.

When a generation of the composite image data using the partial image data 3 is completed at a point 6*f*, the composition processing circuit 151 generates the composition completion signal. When the composition control circuit 152 confirms the existence of the storage completion signal of the partial image data 5 at a point 6*g*, the composition control circuit 152 confirms the reception of the composition completion signal corresponding to the previously generated composition start signal, and generates the composition start signal. Upon confirming the existence of the composition start signal, the composition processing circuit 151 starts to generate the composite image data using the partial image data 5.

As described above, the storage of the partial image data to the partial image memory 14 is skipped when the composite image data is being generated in the image processing apparatus 20 of the first embodiment. Consequently, it is not necessary to generate a timing signal for completing the generation of the composite image data prior to the completion of picking up an image for the partial image data to be subsequently synthesized. It is also possible to use an image pickup apparatus whose time required for picking up an image is shorter than a time required for generating the composite image data.

Some (or most) parts of the partial image data to be read from the image pickup apparatus (e.g., fingerprint sensor) coincide with some parts of the previously read partial image data. In general, it is known that three or more partial image data have common overlapped parts. Consequently, even if the composite image data is generated without using some parts of the partial image data, the accurate composite image data can be generated. Moreover, if a time required for generating the composite image data is shorter than a time required for picking up an image for the partial image data, the composite image data can be generated using all partial image data.

A second embodiment of the present invention will be described below in detail. Like reference symbols and numerals are used to designate like elements in the first and second embodiments.

Figure 7:
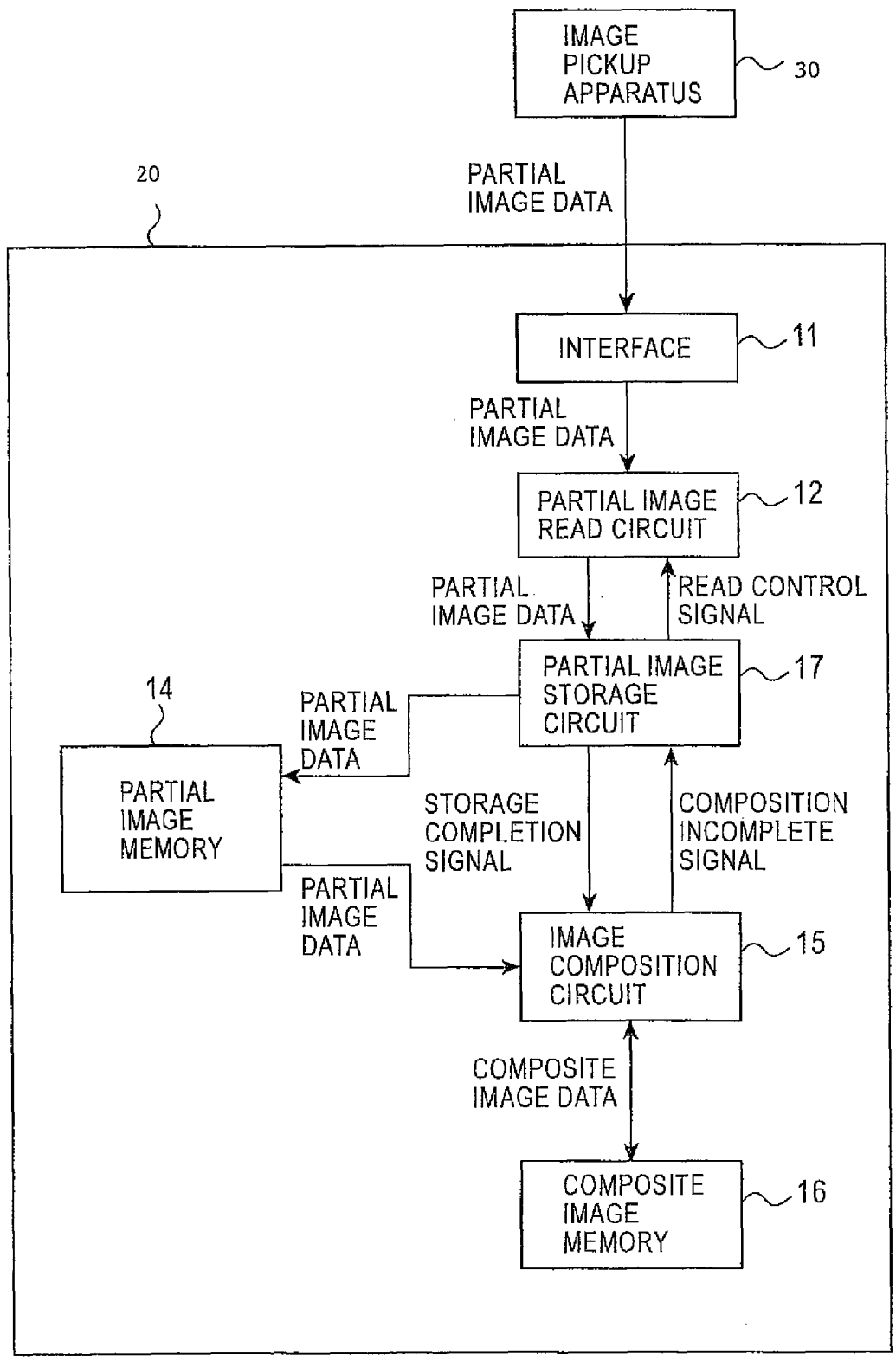
FIG. 7 depicts a block diagram of an image processing apparatus in accordance with a second embodiment of the present invention.

Referring to FIG. 7, the second embodiment of an image processing apparatus 20 will be described. The image processing apparatus 20 reads image data from an image pickup apparatus 30 as partial image data, and generates composite image data by synthesizing the partial image data. An interface 11 is provided for transmitting and receiving data between the image processing apparatus 20 and the image pickup apparatus 30. A partial image reading circuit 12 reads the partial image data, which is data of an image picked up by the image pickup apparatus 30, via the interface 11. A partial image storage circuit 17 stores the partial image data, which is read by the partial image read circuit 12, into a partial image memory 14. The partial image storage circuit 17 generates a storage completion signal when the storage of the partial image data to the partial image memory 14 is completed. The partial image storage circuit 17 stores the partial image data to the partial image memory 14 only when a composition incomplete signal does not exist. The partial image data that is read if a composition incomplete signal exists is not stored to the partial image memory 14. Upon detecting the existence of the composition incomplete signal, the partial image storage circuit 17 generates a read control signal. The partial image memory 14 is provided for storing the image data of a partial image (partial image data) picked up by the image pickup apparatus 30. The partial image reading circuit 12, the partial image storage circuit 17, and the partial image memory 14 configure a partial image memory unit. An image composition circuit 15 is provided for synthesizing the partial image data stored in the partial image memory 14 to generate composite image data. The image composition circuit 15 reads one of the partial image data from the partial image memory 14 and reads composite image data from a composite image memory 16. The image composition circuit 15 then generates composite image data by using the partial image data and the composite image data. The generated composite image data is stored to the composite image memory 16. The image composition circuit 15 generates a composition incomplete signal if the existence of a storage completion signal is detected when the composite image data is being generated. The composite image memory 16 is provided for storing the composite image data synthesized by the image composition circuit 15. The image composition circuit 15 and the composite image memory 16 configure an image composition unit.

The image pickup apparatus 30 is provided for picking up an image while moving an image pickup area (photographing area, sensing area) by degrees and for transmitting the obtained image data to the image processing apparatus 20. The image pickup apparatus 30 is, for example, a fingerprint sensor.

Figure 8:
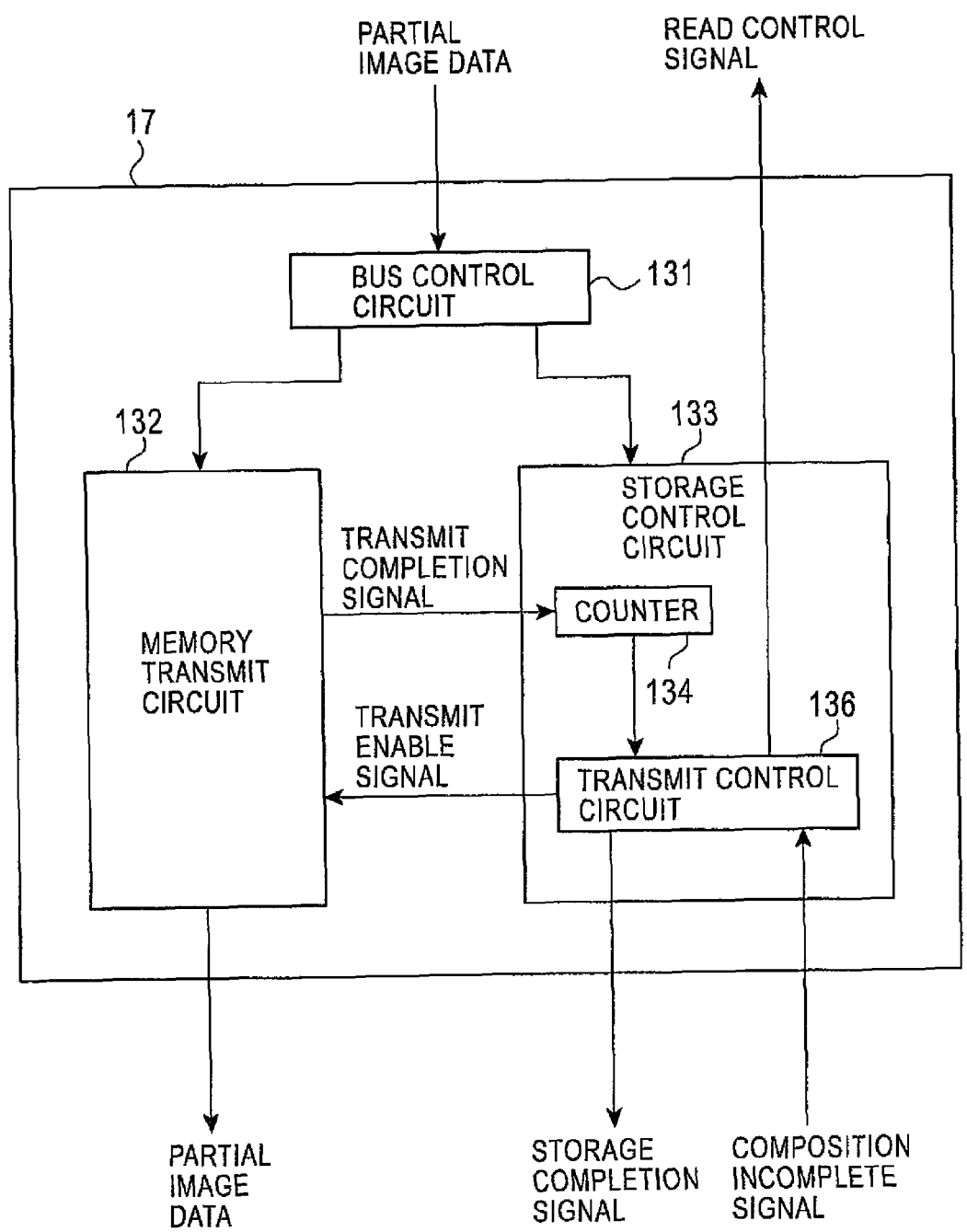
FIG. 8 depicts a block diagram of a partial image storage circuit in the image processing apparatus of FIG. 7.

FIG. 8 shows a configuration of the partial image storage circuit 17. The partial image storage circuit 17 has a bus control circuit 131 for controlling the transmission and reception of data to/from the partial image read circuit 12. The partial image storage circuit 17 also has a memory transmit circuit 132 for transmitting the partial image data to the partial image memory 14, and a storage control circuit 133 for controlling the storage of the partial image data to the partial image memory 14. The memory transmit circuit 132 transmits the partial image data, that is received from the bus control circuit 131, to the partial image memory 14 only when a transmit enable signal supplied from the storage control circuit 133 exists. The memory transmit circuit 132 generates a transmit completion signal every time the transmission of a predetermined amount (unit) of image data is completed. The storage control circuit 133 has a counter 134 for counting the number of generations of the transmit completion signal and a transmit control circuit 136 for controlling the memory transmit circuit 132. The counter 134 receives the transmit completion signal from the memory transmit circuit 132 and counts the number of the received transmit completion signals. The counter 134 then informs the transmit control circuit 136 of the value of the count. The transmit control circuit 136 checks the existence of a composition incomplete signal, and generates the transmit enable signal if the composition incomplete signal does not exist. If the composition incomplete signal exists, the transmit control circuit 136 generates a read control signal. The transmit control circuit 136 confirms the value of the count of the counter 134, and generates the storage completion signal when an amount of image data that has been transmitted from the memory transmit circuit 132 reaches an amount of one partial image data.

Figure 9:
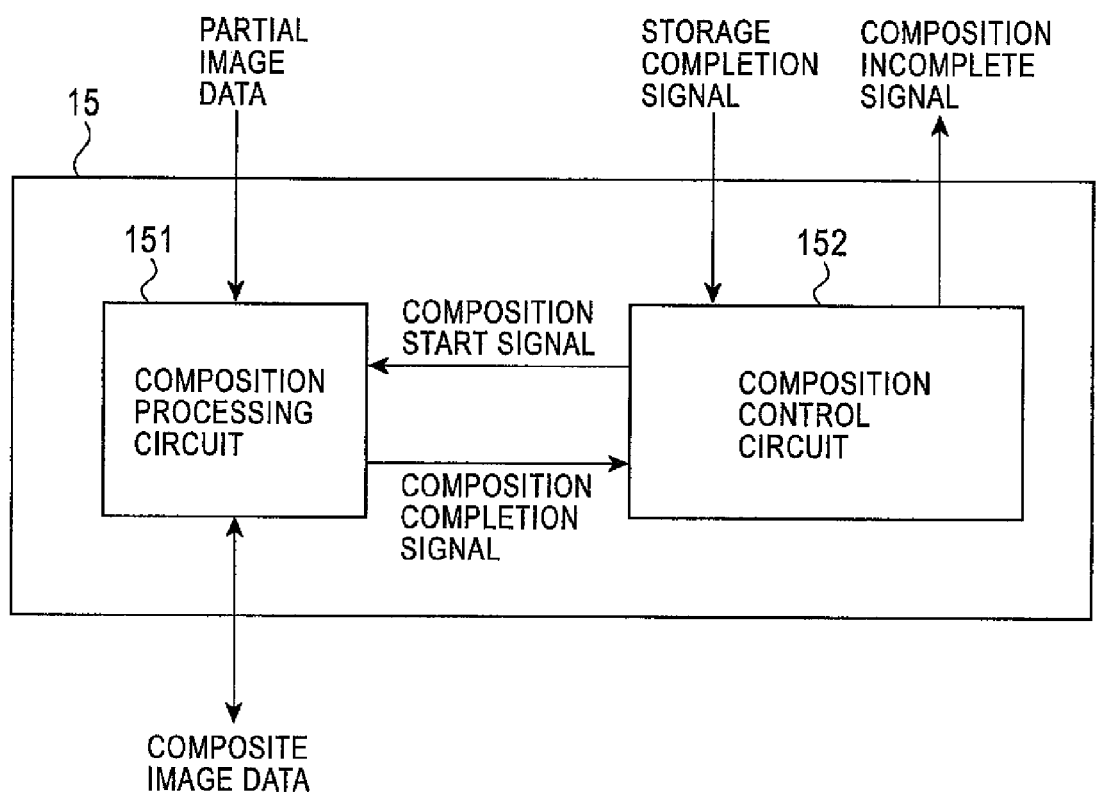
FIG. 9 depicts a block diagram of an image composition circuit in the image processing apparatus of FIG. 7.

FIG. 9 shows a configuration of the image composition circuit 15. The image composition circuit 15 has a composition processing circuit 151 for generating the composite image data and a composition control circuit 152 for controlling the composition processing circuit 151. The composition processing circuit 151 starts the generation of the composite image data when the existence of a composition start signal sent from the composition control circuit 152 is detected. The generation of the composite image data is carried out by synthesizing the partial image data given from the partial image memory 14 to the composite image data given from the composite image memory 16. The resulting composite image data is then stored to the composite image memory 16. When the storage of the composite image data to the composite image memory 16 is completed, the composition processing circuit 151 generates a composition completion signal. When the composition control circuit 152 detects the existence of the storage completion signal, the composition control circuit 152 transmits a new composition start signal to the composition processing circuit 151 if the composition control circuit 152 confirms the reception of the composition completion signal corresponding to the previous composition start signal. On the other hand, the composition control circuit 152 generates a composition incomplete signal if the composition control circuit 152 detects the existence of the storage completion signal but does not confirm the reception of the composition completion signal corresponding to the previously generated composition start signal.

Figure 10:
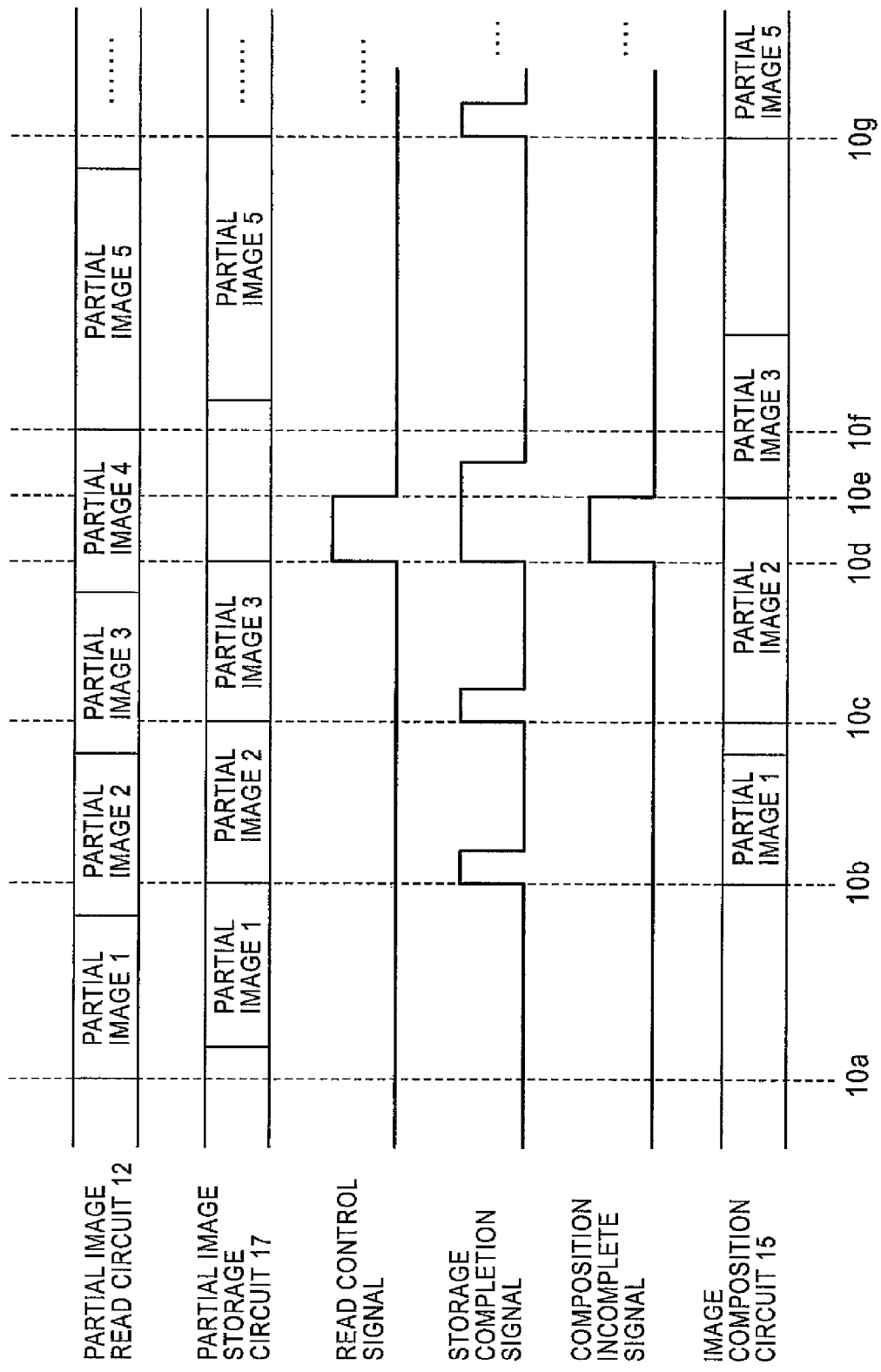
FIG. 10 illustrates a timing chart showing an operation of the image processing apparatus of FIG. 7.

FIG. 10 shows an operation of the image processing apparatus 20 when the five partial image data is read and the composite image data is generated.

When the partial image reading circuit 12 starts to read the partial image data 1 from the image pickup apparatus 30 at a point 10a, the partial image storage circuit 17 checks a composition incomplete signal. If the composition incomplete signal does not exist, the partial image storage circuit 17 stores the partial image data 1 into the partial image memory 14. When the storage of the partial image data 1 to the partial image memory 14 is completed at a point 10b, the partial image storage circuit 17 makes the storage completion signal turn to High. Making the storage completion signal turn to High corresponds to the generation of the storage completion signal. When the image composition circuit 15 detects that the storage completion signal turns to High at the point 10b, that is, when the existence of the storage completion signal is detected, the image composition circuit 15 reads the partial image data 1 from the partial image memory 14 and starts to generate the composite image data. Since the partial image data 1 is the first partial image data, the partial image data 1 is only read and stored to the composite image memory 16 in the generation processing of the composite image data.

When the storage of the partial image data 1 to the partial image memory 14 is completed at the point 10b, the partial image storage circuit 17 confirms that the composition incomplete signal does not exist, and stores the subsequently read partial image data 2 to the partial image memory 14. When the storage of the partial image data 2 to the partial image memory 14 is completed at a point 10*c*, the partial image storage circuit 17 generates the storage completion signal. When the image composition circuit 15 detects the existence of the storage completion signal at the point 10*c*, the image composition circuit 15 reads the partial image data 2 from the partial image memory 14 and reads the composite image data from the composite image memory 16. The image composition circuit 15 then starts to generate the composite image data using the partial image data 2.

When the storage of the partial image data 2 to the partial image memory 14 is completed at the point 10*c*, the partial image storage circuit 17 confirms that the composition incomplete signal does not exist, and stores the subsequently read partial image data 3 to the partial image memory 14. When the storage of the partial image data 3 to the partial image memory 14 is completed at a point 10*d*, the partial image storage circuit 17 generates the storage completion signal.

When the image composition circuit 15 detects the existence of the storage completion signal at the point 10*d* during the generation of the composite image data, the image composition circuit 15 makes the composition incomplete signal turn to High, that is, the composition incomplete signal is generated. The image composition circuit 15 then continues the generation of the composite image data. When the partial image storage circuit 17 detects that the composition incomplete signal turns to High at the point 10*d*, that is, when the existence of the composition incomplete signal is detected, the partial image storage circuit 17 skips the storage of the subsequently read partial image data 4 to the partial image memory 14. The partial image storage circuit 17 makes the read control signal turn to High, that is, the read control signal is generated. When the partial image read circuit 12 detects that the read control signal turns to High, that is, the existence of the read control signal is detected, the partial image read circuit 12 reduces the rate of reading the partial image data to be read after that time.

After the image composition circuit 15 synthesizes the partial image data 2 to the composite image data and stores the resulting composite image data into the composite image memory 16, the image composition circuit 15 makes the composition incomplete signal turn to Low (at a point 10*e*). When the image composition circuit 15 detects the existence of a storage completion signal after the generation of the composite image data using the partial image data 2, the image composition circuit 15 reads the partial image data 3 from the partial image memory 14 and reads the composite image data from the composite image memory 16. The image composition circuit 15 then starts the generation of the composite image data using the partial image data 3.

When the partial image reading circuit 12 starts to read the partial image data 5 at a point 10*f*, the partial image storage circuit 17 confirms that the composition incomplete signal is Low, that is, the composition incomplete signal does not exist. Then, the partial image storage circuit 17 stores the partial image data 5, which has been read after the partial image data 4, to the partial image memory 14. When the storage of the partial image data 5 to the partial image memory 14 is completed at a point 10*g*, the partial image storage circuit 17 generates the storage completion signal. When the image composition circuit 15 detects the existence of the storage completion signal at the point 10*g*, the image composition circuit 15 reads the partial image data 5, which is stored after the partial image data 3, and the composite image data. The image composition circuit 15 then synthesizes the partial image data 5 to the composite image data and stores the resulting composite image data to the composite image memory 16.

The storage completion signal turns to Low after the start of the generation of the composite image data using the corresponding partial image data. The state in which the storage completion signal is Low corresponds the state in which the storage completion signal does not exist.

Figure 11:
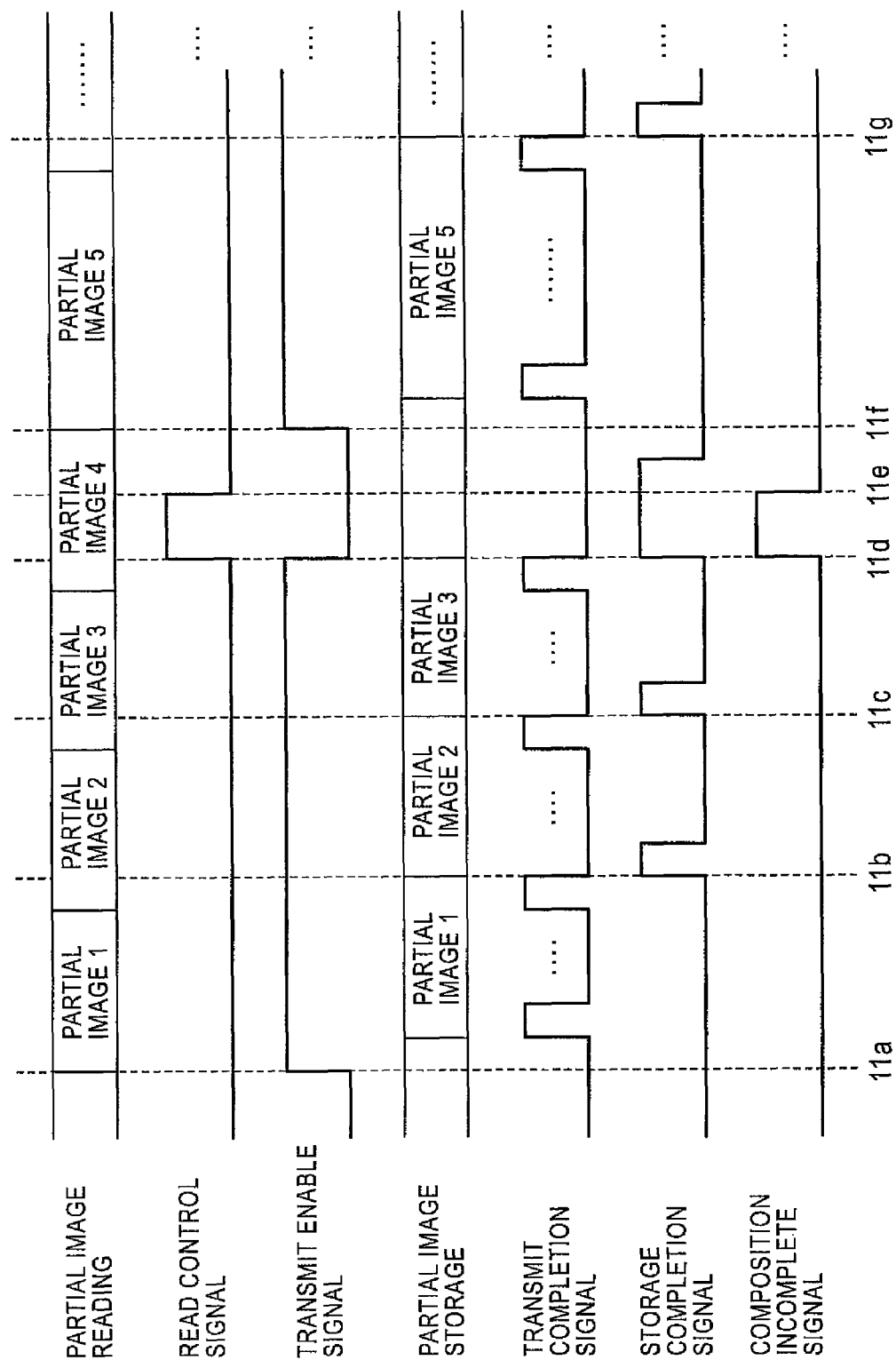
FIG. 11 illustrates a timing chart showing an operation of the partial image storage circuit in the image processing apparatus of FIG. 7.

FIG. 11 shows an operation of the partial image storage circuit 17 when the partial image data is read and the composite image data is generated.

When the partial image reading circuit 12 starts to read the partial image data 1 from the image pickup apparatus 30 at a point 11*a*, the transmit control circuit 136 checks a composition incomplete signal. If the composition incomplete signal does not exist, the transmit enable signal turns to High, that is, the transmit enable signal is generated. When the memory transmit circuit 132 confirms that the transmit enable signal is High, that is, the existence of the transmit enable signal is confirmed, the memory transmit circuit 132 transmits the partial image data 1 to the partial image memory 14. The memory transmit circuit 132 makes the transmit completion signal turn to high, that is, the transmit completion signal is generated every time the transmission of image data of a predetermined unit is completed.

The counter 134 receives the transmit completion signal from the memory transmit circuit 132 and carries out counting. The transmit control circuit 136 checks the value of the count of the counter 134. The transmit control circuit 136 makes the storage completion signal turn to high, that is, the storage completion signal is generated (at a point 11*b*), when an amount of image data that has been transmitted reaches an amount of the partial image data 1. When the transmission of the partial image data 1 is completed at the point 11*b*, the memory transmit circuit 132 confirms the existence of the transmit enable signal and transmits the subsequently read partial image data 2 to the partial image memory 14. The memory transmit circuit 132 generates the transmit completion signal every time the transmission of image data of a predetermined unit is completed.

The counter 134 receives the transmit completion signal from the memory transmit circuit 132 and carries out counting. The transmit control circuit 136 checks the value of the count of the counter 134, and generates the storage completion signal (at a point 11*c*) when an amount of image data that has been transmitted reaches an amount of the partial image data 2. When the transmission of the partial image data 2 is completed at the point 11*c*, the memory transmit circuit 132 confirms the existence of the transmit enable signal and transmits the subsequently read partial image data 3 to the partial image memory 14. The memory transmit circuit 132 generates the transmit completion signal every time the transmission of image data of a predetermined unit is completed.

The counter 134 receives the transmit completion signal from the memory transmit circuit 132 and carries out counting. The transmit control circuit 136 checks the value of the count of the counter 134, and generates the storage completion signal (at a point 11*d*) when an amount of image data that has been transmitted reaches an amount of the partial image data 3. When the transmit control circuit 136 confirms the existence of the composition incomplete signal at a point 11*d*, the transmit control circuit 136 makes the transmit enable signal turn to Low. When the memory transmit circuit 132 confirms that the transmit enable signal is Low, i.e., when it confirms that the transmit enable signal is absent, the memory transmit circuit 132 stops the data transmission to the partial image memory 14. Consequently, the partial image data 4, which has been read subsequently to the partial image data 3, is not stored to the partial image memory 14. The transmit control circuit 136 makes the read control signal turn to High, that is, the read control signal is generated.

When the partial image reading circuit 12 starts to read the partial image data 5 from the image pickup apparatus 30 at a point 11f, the transmit control circuit 136 confirms the absence of the composition incomplete signal, and generates the transmit enable signal. When the memory transmit circuit 132 confirms the existence of the transmit enable signal, the memory transmit circuit 132 transmits the partial image data 5 to the partial image memory 14. The memory transmit circuit 132 generates the transmit completion signal every time the transmission of image data of a predetermined unit is completed.

The counter 134 receives the transmit completion signal from the memory transmit circuit 132 and carries out counting. The transmit control circuit 136 checks the value of the count of the counter 134, and generates the storage completion signal (at a point 11g) when an amount of image data that has been transmitted reaches an amount of the partial image data 5.

Figure 12:
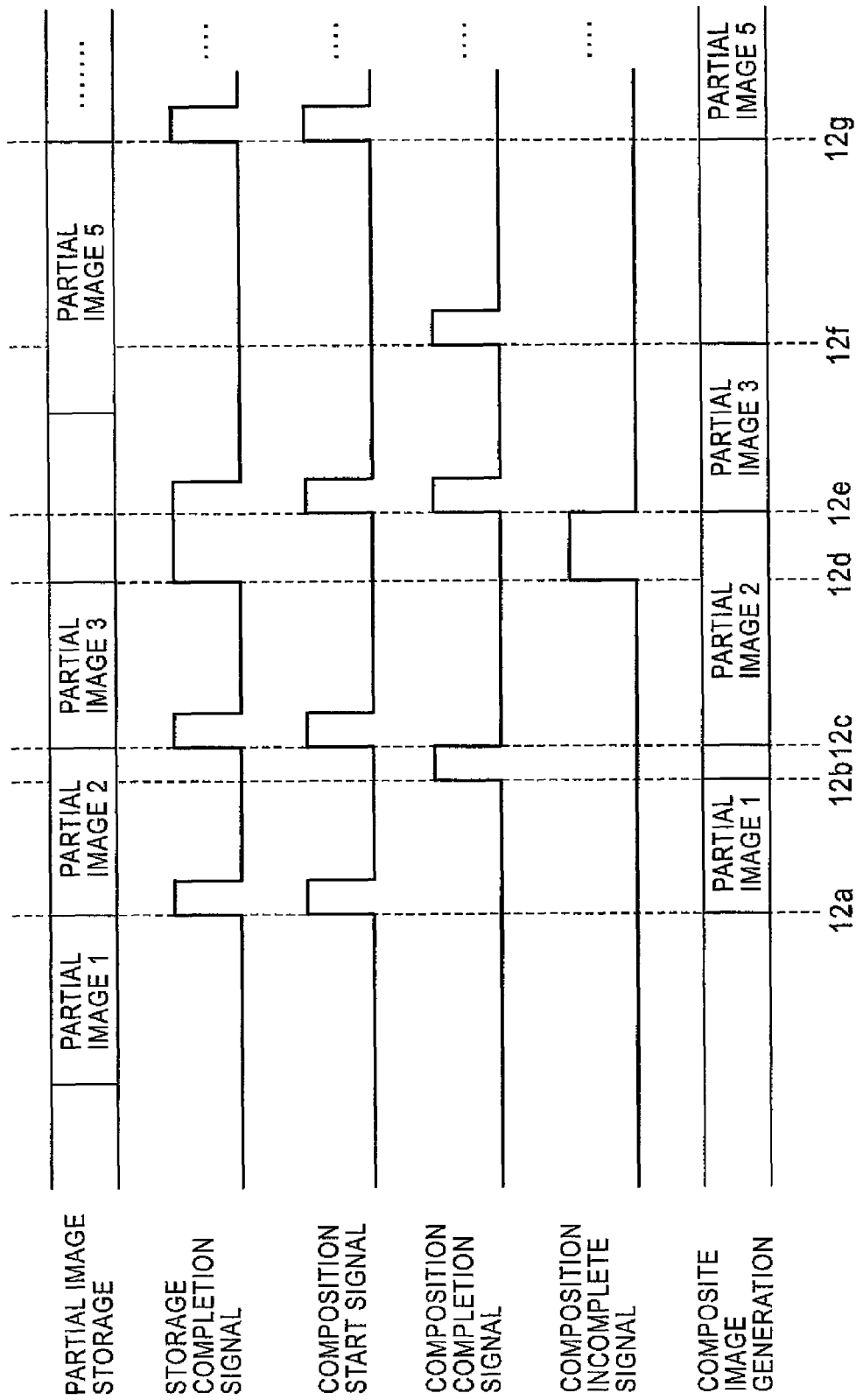
FIG. 12 illustrates a timing chart showing an operation of the image composition circuit in the image processing apparatus of FIG. 7.

FIG. 12 shows an operation of the image composition circuit 15 when the partial image data is read and the composite image data is generated.

When the composition control circuit 152 confirms the existence of the storage completion signal of the partial image data 1 at a point 12a, the composition control circuit 152 confirms that the composition processing circuit 151 is not generating the composite image data, and makes the composition start signal turn to High, that is, the composition start signal is generated. When the composition processing circuit 151 confirms that the composition start signal is High, that is, the existence of the composition start signal is confirmed, the composition processing circuit 151 starts to generate the composite image data using the partial image data 1. When the composition processing circuit 151 completes the generation of the composite image data using the partial image data 1, the composition processing circuit 151 makes the composition completion signal turn to High, that is, the composition completion signal is generated (at a point 12b).

When the composition control circuit 152 confirms the existence of the storage completion signal of the partial image data 2 at a point 12c, the composition control circuit 152 confirms the reception of the composition completion signal corresponding to the previously generated composition start signal (i.e., it confirms that the composition processing circuit 151 is not generating the composite image data), and generates the composition start signal. Upon confirming the existence of the composition start signal, the composition processing circuit 151 starts to generate the composite image data using the partial image data 2.

If the composition control circuit 152 confirms the existence of the storage completion signal of the partial image data 3 at a point 12d, the composition control circuit 152 cannot confirm the reception of the composition completion signal corresponding to the previously generated composition start signal. Consequently, the composition control circuit 152 determines that the composition processing circuit 151 is generating the composite image data, and makes the composition incomplete signal turn to High.

When a generation of the composite image data using the partial image data 2 is completed at a point 12e, the composition processing circuit 151 generates the composition completion signal. When the composition control circuit 152 confirms the reception of the composition completion signal, the composition control circuit 152 makes the composition incomplete signal turn to Low, and generates the composition start signal. Upon confirming the existence of the composition start signal, the composition processing circuit 151 starts to generate the composite image data using the partial image data 3.

When a generation of the composite image data using the partial image data 3 is completed at a point 12f, the composition processing circuit 151 generates the composition completion signal. When the composition control circuit 152 confirms the existence of the storage completion signal of the partial image data 5 at a point 12g, the composition control circuit 152 confirms the reception of the composition completion signal corresponding to the previously generated composition start signal, and generates the composition start signal. Upon confirming the existence of the composition start signal, the composition processing circuit 151 starts to generate the composite image data using the partial image data 5.

As described above, the image processing apparatus 20 of the second embodiment skips the storage of the partial image data to the partial image memory 14 when the composite image data is being generated. If the storage of the subsequent partial image data is completed during the generation of the composite image data, the read control signal is generated so that the rate of reading the partial image data is reduced. Consequently, it is not necessary to generate a timing signal for completing the generation of the composite image data prior to the completion of picking up an image for the partial image data to be subsequently synthesized. Since the rate of reading the partial image data is reduced by the read control signal, the generation of the composite image data can be completed prior to the completion of picking up an image for the partial image data to be subsequently synthesized.

This application is based on Japanese Patent Application No. 2007-212745 filed on Aug. 17, 2007 and the entire disclosure thereof is incorporated herein by reference.

What is claimed is:

1. An image processing apparatus for using image data, which is obtained by picking up an image while gradually moving an image pickup area of an image pickup device, as partial image data and for generating composite image data by synthesizing the partial image data, the image processing apparatus comprising:
   a partial image memory unit for reading the partial image data from the image pickup device and sequentially storing the partial image data; and
   an image composition unit for generating the composite image data by synthesizing the partial image data obtained from the partial image memory unit,
   wherein the partial image memory unit does not store the partial image data when a composition incomplete signal is present, and stores the partial image data when the composition incomplete signal is absent;
   the partial image memory unit generates a storage completion signal upon completion of the storage of the partial image data;
   the image composition unit generates the composition incomplete signal when the composite image data is being generated, under existence of the storage completion signal; and
   the image composition unit reads at least one of the partial image data from the partial image memory unit and starts the generation of the composite image data using the at least one of the partial image data if the composite image data is not being generated, under the existence of the storage completion signal.

2. The image processing apparatus according to claim 1, wherein the partial image memory unit reduces a rate of reading the partial image data under the existence of the composition incomplete signal.

3. The image processing apparatus according to claim 1, wherein the image pickup device includes a fingerprint sensor or a barcode reader.

4. The image processing apparatus according to claim 1, wherein the image processing apparatus is a fingerprint authentication apparatus.

5. The image processing apparatus according to claim 1, wherein the partial image memory unit includes a partial image reading circuit, a partial image storage circuit and a partial image memory.

6. The image processing apparatus according to claim 5, wherein the image composition unit includes an image synthesizing circuit for synthesizing first-provided partial image data with second-provided partial image data, and a composite image memory for storing resulting composite image data.

* * * * *